United States Patent [19]

Block et al.

[11] Patent Number: 5,204,866
[45] Date of Patent: Apr. 20, 1993

[54] BIDIRECTIONAL FREE-SPACE OPTICAL BUS FOR ELECTRONICS SYSTEMS

[75] Inventors: Timothy R. Block; Tong Lu, both of Rochester, Minn.

[73] Assignee: International Business Machines Corporation, Armonk, N.Y.

[21] Appl. No.: 831,729

[22] Filed: Feb. 5, 1992

Related U.S. Application Data

[62] Division of Ser. No. 597,230, Oct. 15, 1990, Pat. No. 5,113,403.

[51] Int. Cl.[5] ............................... H01S 3/13
[52] U.S. Cl. ........................ 372/27; 372/29; 372/32; 359/152
[58] Field of Search ............ 372/27, 29, 32; 359/152, 154, 164, 181, 109, 122

[56] References Cited

U.S. PATENT DOCUMENTS

| | | | |
|---|---|---|---|
| 3,842,367 | 10/1974 | Schlossberg | 372/32 |
| 4,063,083 | 12/1977 | Cathey et al. | 250/199 |
| 4,199,226 | 4/1980 | Weber et al. | 350/157 |
| 4,270,862 | 6/1981 | Hewitt | 356/5 |
| 4,682,311 | 7/1987 | Matsubayashi et al. | 369/13 |
| 4,850,044 | 7/1989 | Block et al. | 455/607 |
| 4,941,205 | 7/1990 | Horst et al. | 455/605 |
| 5,107,512 | 4/1992 | Shibutani | 372/27 |

FOREIGN PATENT DOCUMENTS

2475220 8/1981 France ............... 372/27

OTHER PUBLICATIONS

Understanding CD Players, Home Audio, 79.

Primary Examiner—Georgia Y. Epps
Attorney, Agent, or Firm—J. Michael Anglin

[57] ABSTRACT

An electronics system communicates among its subsystems by a free-space optical bus. The bus transmits signals bidirectionally along a single linear axis as polarized beams of light. Each subsystem has a bus interface unit for generating outgoing beams along both axial directions, and for receiving incoming beams from both axial directions. The interface units use laser generators, photodetectors, and amplitude beam splitters.

22 Claims, 3 Drawing Sheets

BIDIRECTIONAL FREE-SPACE OPTICAL BUS FOR ELECTRONICS SYSTEMS

This is a divisional of co-pending application Ser. No. 07/597,230 filed on Oct. 15, 1990, U.S. Pat. No. 5,113,403.

BACKGROUND OF THE INVENTION

The present invention concerns the interconnection of subsystems of an electronics system with each other, and more specifically relates to an electrooptical interface for interconnecting such subsystems together via a single-axis, bidirectional free-space optical bus.

Electronics systems of several major types are commonly packaged as a group of fixed or variable subsystems interconnected with each other by a bus carrying signals from one subsystem to the others.

Digital computers are usually designed in this way. A number of individual cards or logic books form subsystems which plug into a backplane bus carrying signals for data, storage addresses, interrupts, and other purposes. One card, for example, may include a processor for executing application programs, while others may include read/write storage, controllers for workstations or displays, adapters for mass storage, or interfaces to local-area networks or communications lines. The functional electronics circuits on each card gain access to the common bus for transmitting data, addresses, and control signals according to a predetermined bus protocol.

This type of packaging has significant advantages. Different numbers of different kinds of subsystems can be configured into the system. Customization of the system is simple enough that often the user can perform it unaided. New functions and improved technology can be incorporated at a later date, without replacing the entire system. Diagnostics and repair of the system are enhanced by the ability to isolate subsystems easily.

Nevertheless, conventional wired backplane buses have their costs and disadvantages. As electronics technology becomes more and more integrated, the connectors for transmitting signals from one unit to another become increasingly expensive and unreliable. This is particularly true of backplane busses, which must withstand repeated insertion cycles, and which must often provide mechanical support and alignment for the subsystems, as well as providing electrical connections.

The art has sought alternatives to the parallel wired ("copper") backplane bus for interconnecting subsystems of an electronics system. The art has even sought out other technologies for implementing such busses. Optical technology in particular has provided a number of ways to replace copper backplane busses. Despite the need to convert high-speed electrical signal to optical signals and back again—and frequently to convert between serial and parallel signals—many people have proposed optical backplane busses of one form or another for a long time.

Yet, for all the various optical backplane busses put forth, conventional copper busses are still the undisputed rulers of the world of presently available electronics systems. Optical signals are transmitted only from one designated point to another designated point, within optical fibers. The major problem seems to be that previous optical busses which could possibly be employed for or adapted to interconnecting large and variable numbers of subsystems are more expensive and unreliable than the wired busses and connectors that they would replace. Exotic optical components, precise alignment among the components, exact positioning of the different subsystems relative to each other, large size of the optical units—these attributes of prior optical interfaces all contribute to the failure to employ optical technology in electronics systems where multiple subsystems must communicate among each other over a common bus.

SUMMARY OF THE INVENTION

The present invention provides an electronics system made up of a number of subsystems interconnected by a new type of optical bus. The invention also provides a unique individual electronics subsystem for such a system, and further provides an electro-optical unit for interfacing an electronics subsystem to the optical bus.

A system according to the invention includes a number of individual subsystems mounted in an enclosure such that optical interface units on each subsystem form a single-axis, bidirectional, free-space optical bus which interconnects electrical signals among the various subsystems.

A subsystem of the invention includes a support member, functional electronics circuits, means for converting electronics signals to and from optical signals, and means for transmitting the optical signals in two different directions along a single linear axis, and for receiving optical signals from the same two directions along the same single axis.

An electro-optical interface unit of the invention converts electrical signals into a linearly polarized optical beam, passes the beam essentially unattenuated through a polarizing beam splitter, converts the beam to circular polarization, and splits the beam into two outgoing beams traveling along the two directions of the bus. The unit also receives an incoming circularly polarized beam from either of the two directions, diverts it along the path of the first beam, converts its polarization to a different linear polarization, diverts it again, and converts it to electrical form.

The system optical bus does not require close tolerances or alignment among a large number of component subsystems. In fact, the necessary alignment may usually be achieved with mechanical elements and associated tolerances already required for other purposes, such as power connections, mechanical support, and environmental isolation. The individual subsystems likewise need no construction techniques beyond those required for normal mechanical and electrical purposes. The optical interface units operate at much lower losses than previous designs, allowing a large number of subsystems in a single system without exceeding sensitivity and noise limits of conventional detectors and receiver circuits. The units employ components and fabrication which are already employed in mass-produced consumer equipment, and which are therefore very inexpensive, easy to manufacture, and reliable.

DESCRIPTION OF A PREFERRED EMBODIMENT

Figure 1:
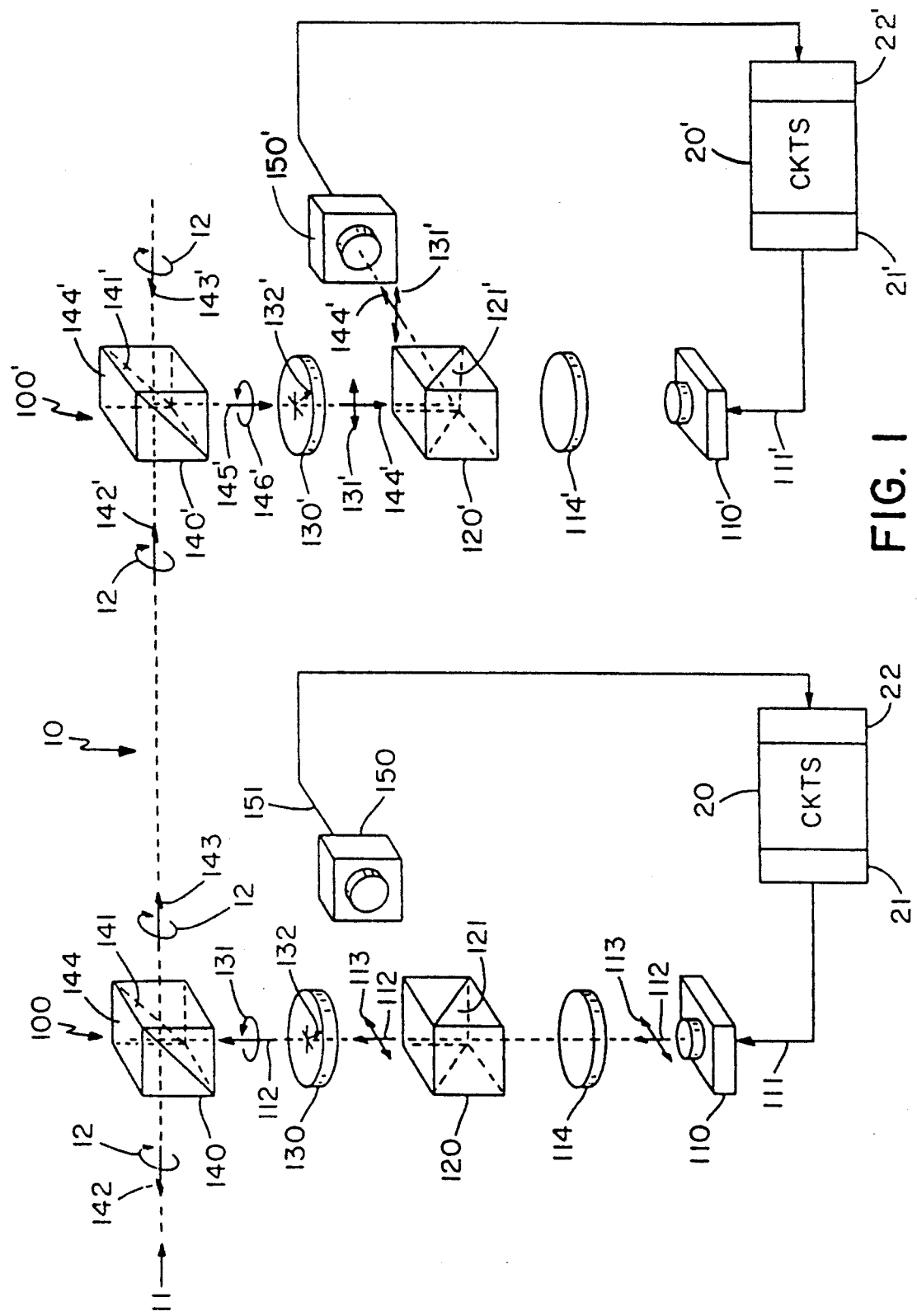
FIG. 1 is an exploded, partially schematic view of two optical-bus interface units according to the invention.

FIG. 1 shows the optical units and paths of two interface units. One unit, 100, is shown transmitting a signal on the optical bus, designated generally as 10. The other unit, 100', is shown receiving a signal on the bus 10. The construction of interface units 100 and 100' is identical.

Laser diode 110 converts a high-frequency serial digital electrical signal 111 into a coherent (single wavelength) optical signal in a narrow optical beam 112. The particular wavelength chosen is not critical; present-day inexpensive components operate mostly in the near-infrared and visible portions of the electromagnetic spectrum. This outgoing beam 112 is transversely linearly polarized in a mode or direction along arrow 113. Laser 110 preferably has a conventional gain-guided structure for low optical-feedback noise susceptibility.

Inexpensive laser diodes are commercially available for audio (compact disc) and other applications. Most such diode lasers inherently emit very strongly polarized beams—from 50:1 to 200:1, depending upon construction and operating power. (The same diode is more polarized at higher power than at lower power.) For most diodes, the present application requires no external components to attain sufficient polarization of beam 113; the diode is merely physically oriented so that its polarization is in the desired direction 113. (However, conventional components are available if needed to achieve an acceptable level of polarization externally to the diode itself.)

Lens 114 collimates beam 112 into a narrow pattern, still in the polarization mode 113. In some cases, no collimating is required. In this embodiment, lens 114 is preferably a conventional cylindrical graded-index (GRIN) lens; this allows simple packaging at a reasonable cost.

Polarizing beam splitter (PBS) 120 is oriented so that linearly polarized beam 112 travels as a P wave straight through internal surface 121. Splitter 120 does not alter polarization mode 113, and thus loses very little of the outgoing beam's energy.

Polarizing beam splitters are commercially available optical elements. A representative conventional unit comprises two annealed glass prisms and multiple layered coatings at their interface. The coatings form a quarter-wave resonant reflective dielectric stack at a particular band of frequencies. At a 45-degree angle of incidence, the radiation is incident at or near the Brewster or polarizing angle. The radiation component having its electric-field vector polarized parallel to the plane of incidence (the P wave) proceeds through the coatings with very little reflection. The radiation having its E field perpendicular to this plane (the S wave) partially reflects at each interface between adjacent coatings; a large number of such partial reflections resonate to produce at least 98% reflection of the S wave energy. This type of splitter is sometimes called a "pile of plates" polarizer.

Quarter-wave plate 130 converts the polarization 113 of beam 112 into a circular polarization mode 131, by having an optical axis 132 oriented at a 45-degree angle to the P plane.

Quarter-wave plates are also commercially available optical elements. A representative conventional unit is a birefringent crystal plate. Birefringent materials have two mutually perpendicular optical axes, both perpendicular to the direction of travel through the plate. Radiation along the 'fast' axis has a higher speed traveling along the 'fast' axis has a higher speed through the plate than does radiation traveling along the 'slow' axis. Such a plate is a quarter-wave plate at a particular frequency band if the thickness of the plate is such that the difference in optical path length through the plate along the two optical axes amounts to ¼ wavelength in the defined frequency band. If either optical axis has a 45-degree angle to a linearly polarized incident wave, the wave emerges from the other side of the plate having a circular polarization.

Amplitude beam splitter (ABS) 140 has an internal surface 141 which reflects outgoing beam 112 into two collinear axial beams 142 and 143 along both directions of the axis 11 of a single optical bus 10. Bus 10 is a "free-space" bus; that is, the signal-carrying optical beam need not be spatially confined in any optical component or medium, except when it passes through interface units 100. Each beam carries a portion of the power of beam 112; both axial beams have circular polarization, as shown at 12 in FIG. 1. Splitter 140 has a conventional design, except that its upper surface 145 has a totally reflective (mirror) coating.

Amplitude beam splitters are commercially available elements used in many applications. Two annealed glass prisms have a partially reflective coating at their common surface which reflects a portion of the radiation energy incident through the opposite surface of either prism, and reflects the remaining portion. Amplitude beam splitters are not sensitive to polarization, nor do they modify it. In the particular design of FIG. 1, beam 112 travels upward until it strikes surface 141 from the bottom. Surface 141 reflects some of the beam energy into beam 143. The remaining energy continues upward, and strikes coating 145. This coating reflects all the impinging energy downward. When it strikes surface 141 from the top. Surface 141 again reflects part of this energy into beam 142. (The remainder of this beam reenters the interface unit, and is not available to bus 10.)

The transmission coefficient of ABS surface 141 can conventionally be varied within wide limits to vary the portion or fraction x of the beam energy which is transmitted through the surface; the remaining fraction 1−x of the energy is reflected at this surface. If n is the number of subassemblies in a system, then the worst-case transmission y through all ABS units is $$y = (1-x)^2 x^{n-1}$$

Calculation reveals that y has an extremum at $x = (n-1)/(n+1)$. For six subassemblies in a system (i.e., n=6), the optimum value of the transmission coefficient is x=0.71. The worst-case at this value of x occurs with transmission through five splitters, $$y^5 = 0.0152,$$

which corresponds to an 18.2 dB worst-case loss.

For a very large system having fourteen subassemblies (n=14), the optimum coefficient is x=0.87. The worst-case transmission at this value of x is $$y^{13} = 0.00277,$$

which represents a 25.6 dB worst-case loss.

Thus, if the approximate number of subassemblies is known in advance, interface unit 100 can be optimized for that number so as to reduce total losses on the bus 10, making the receiver circuits easier to design and less expensive.

Axis 11 of free-space optical bus 10 extends in a single line through the amplitude beam splitters of a number of interface units. One such interface unit, 100' illustrates the reception of optical signals on bus 10.

Amplitude beam splitter 140' intercepts transmitted beam 143 as beam 142'. Again, beam 142' has circular polarization. Surface 141' of splitter 140' passes a portion of beam 142' straight through to beam 143', the particular portion or fraction depending upon its transmission coefficient, as described above. Surface 141' reflects the other portion upward to totally reflective coating 144', which returns all the incident energy downward to surface 141', where a portion of it proceeds straight downward to form incoming beam 145'. Surface 141' reflects the remainder of the downward beam back along beam 142'. (For a beam incident from the right along beam 143', surface 141' passes part of the energy straight through to beam 142', and reflects the remainder downward to form incoming beam 145'.)

Beam 145', still having circular polarization 146', passes downward through quarter-wave plate 130'. Plate 130' converts the circular polarization to a transverse linear polarization mode along arrow 133', orthogonal to the mode 113 of beam 112 in unit 100. This polarization causes the internal surface 121' of polarizing beam splitter 120' to reflect incoming beam 145' through a right angle onto a photodetector 150'. Again, the use of a polarizing splitter at 120' results in at most a few percent power loss in beam 145' as it is redirected toward detector 150'; an amplitude beam splitter having a 0.5 transmission coefficient would lose 0.75 (6 dB) of the available beam power at this point: half of the power from the laser, and half the beam power into the detector.

Photodetector 150' converts the signal on incoming optical beam 145' to an electrical signal 151'. Detector 150' is a conventional photodiode or phototransistor; it need not be sensitive to polarization; that is, it converts the optical energy of the beam to electrical energy, regardless of polarization.

Block 20 shows a single schematic unit representing all the functional electronics circuits or components associated with interface unit 100. Such circuits may, for example, perform any card-level function of a digital data system, such as a main processor, memory, or an I/O adapter. Circuits 20 may gain access to bus 10 in exactly the same manner that they would use for a conventional wired backplane bus; they may also transmit signals 111 and receive signals 151 in any conventional manner. Since wired buses, both backplane and on-card, usually carry parallel signals, circuits 20 may include conventional thresholding high-speed parallel-to-serial and serial-to-parallel converters 21 and 22 for converting between the parallel signals within circuits 20 and the serial signals 111 and 151.

Figure 2:
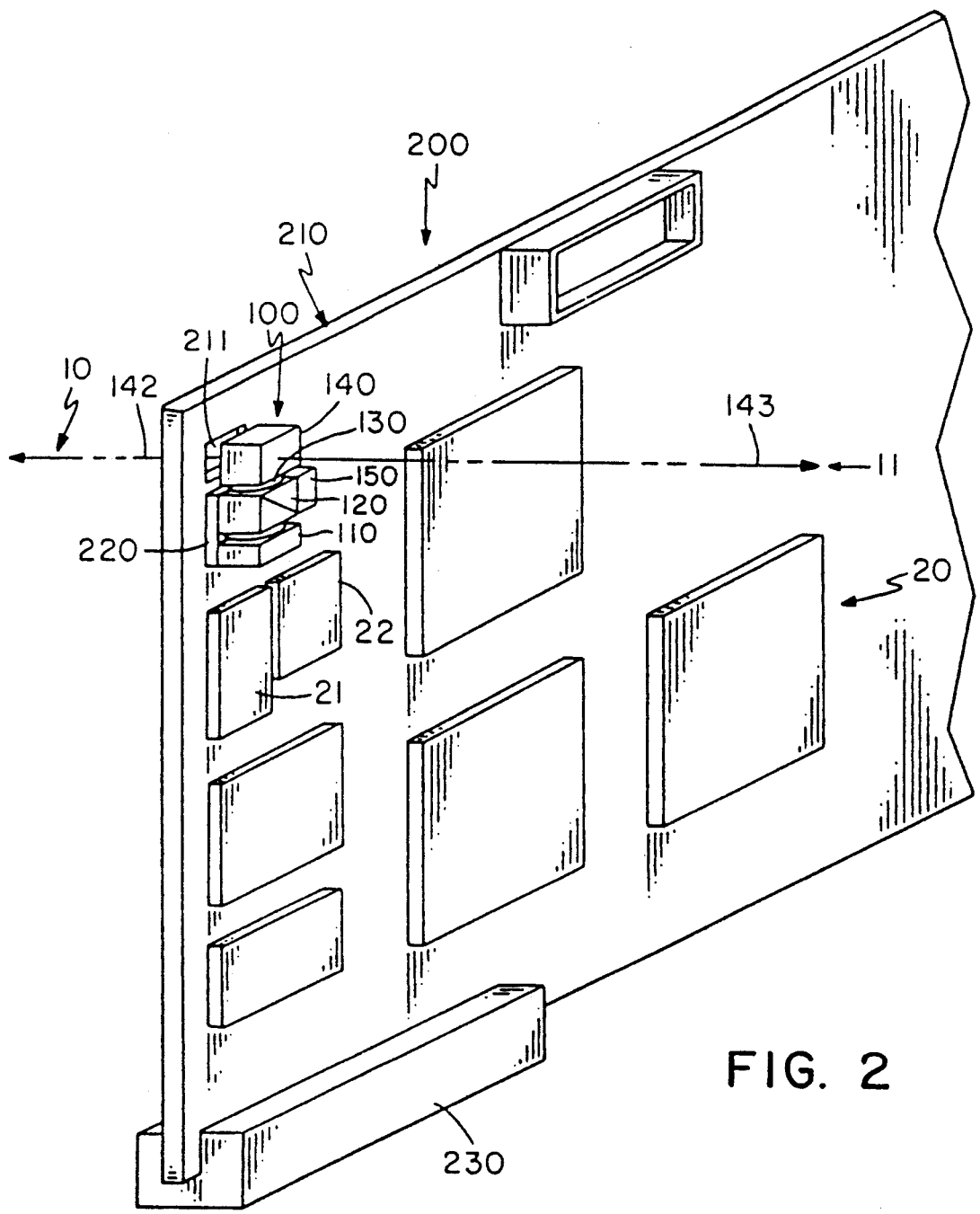
FIG. 2 is a partial view of an electronics subsystem according to the invention.

FIG. 2 shows an electronics subsystem 200 containing an optical bus interface 100 and functional circuits 20 as shown in FIG. 1.

Interface unit 100 is preferably physically constructed with its elements 110-150 bonded together so that the entire unit 100 forms a single rigid structure or optical bench The optics are not diffraction-limited, so that positioning tolerances are not critical. The construction and tolerances of unit 100 are quite similar to those of the optics presently mass-produced for audio compact-disc (CD) players. Fabricating the entire unit 100 as a single structure is inexpensive, and avoids damage during manufacture and use of the subsystem 200. If desired, interface unit could be fabricated on a separate base or substrate (not shown).

Interface unit 100 is mounted on a subassembly including a printed-circuit card 210. It has a predetermined position with respect to a connector 220 which provides mechanical support and also contains electrical connections to laser diode 110 and photodetector 150 for signals 111 and 151, FIG. 1. Circuits 20 occupy most of the remaining area of card 210. Conversion circuits 21 and 22 are preferably located close to unit 100, because of the high frequencies of the serial signals 111 and 151.

Interface unit 100 uses only a small portion of the area of card 210. A typical unit uses splitters 120 and 140 about 0.5 cm on a side; total outside dimensions are about 1.5 cm long (vertically in FIG. 2), by 0.7 cm high (perpendicular to card 210) by 0.8 cm wide. The outside dimensions of a small card for a personal computer typically run 9 cm high (vertically in FIG. 2) by 30 cm long. Even taken together with conversion circuitry 21 and 22, the optical interface takes up no more space on card 210 than would be required merely for a connector for a conventional wired backplane bus.

The interface unit communicates with optical bus 10 by means of an aperture 211 in card 210. Alternatively, a corner or other area of card 210 could be cut away, or element 140 could project beyond an edge of card 210. Card 210 also includes a card-edge connector 230 for electrical power to circuits 20 and interface unit 100. Connector 230 may also provide signals for other purposes. If, for example, subsystem 200 is an I/O processor, plug 230 could carry digital signals from circuits 20 to I/O hardware such as disk drives or communications lines. The number and placement of such external connections is irrelevant to the invention. In fact, the invention allows greater latitude for such connections, since the large card-edge area normally taken up by a parallel wired backplane bus is not required. Also, connector 230 may have a lower pin density than would be required for a normal backplane bus, and hence will be cheaper and more reliable.

Connector 230 also provides positioning for interface unit 100. Card 210 may also include positioning means other than—or in addition to—connector 230, if desired. In most cases, however, the requirements of interface unit 100 will not require that card 210 be positioned any more precisely than is required for other purposes, such as mechanical fit and external electrical connections.

Figure 3:
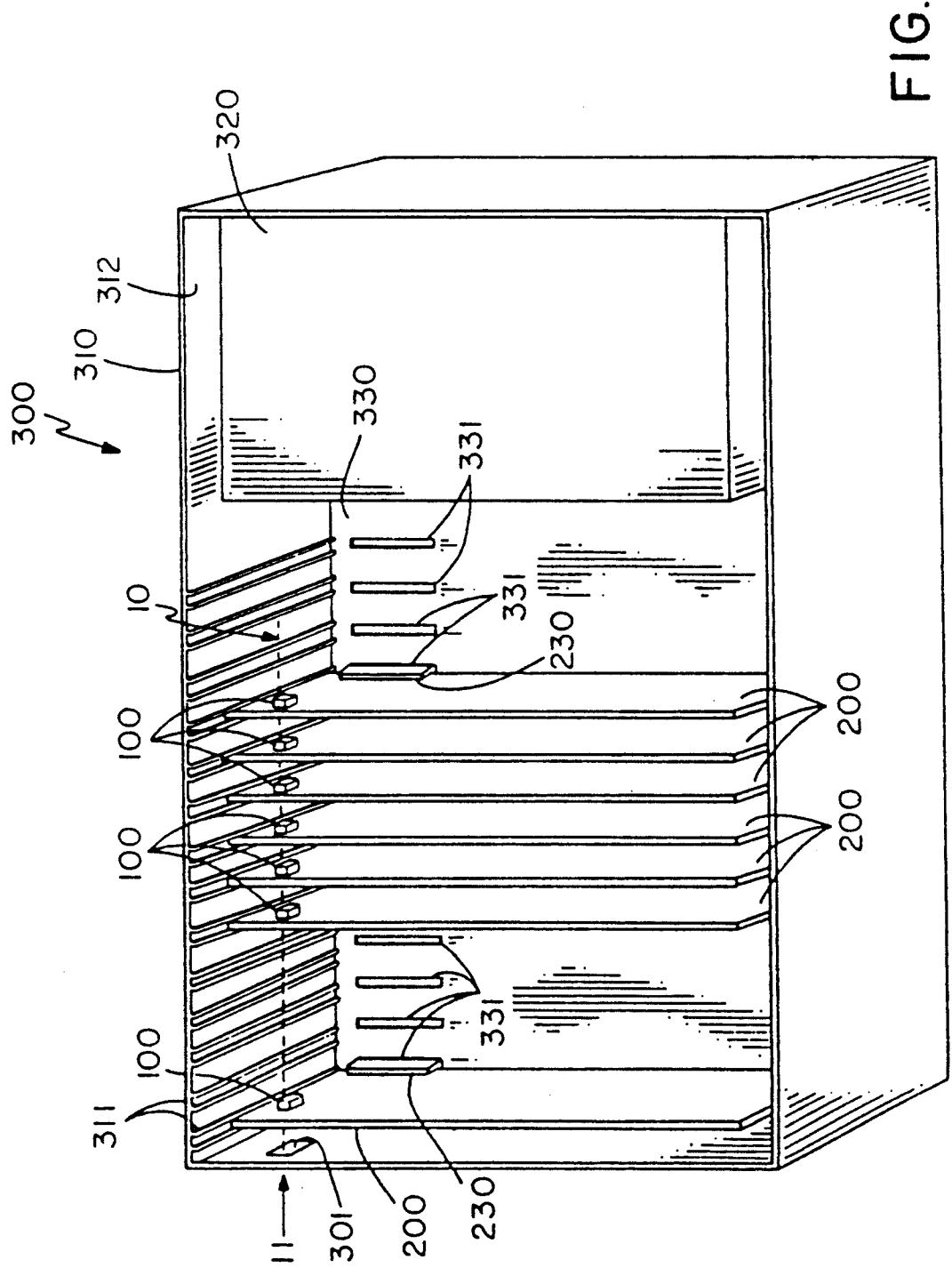
FIG. 3 shows a complete electronics system having an optical bus according to the invention.

FIG. 3 shows an example of an entire system 300 constructed according to the invention. System 300 may form, for example, the card cage of a standalone personal computer, or the central electronics complex (CEC) of a mid-range data processing system.

Enclosure or frame 310 provides mechanical support and environmental shielding for system 300. (The term "enclosure" must be taken in the broadest sense; its only function which is strictly necessary to the present invention is to position the subassemblies properly along the optical bus.) Internal subenclosures such as 320 provide auxiliary functions such as power, cooling, and mass storage. An internal base 330 provides mechanical support and electrical interconnections among the various units of system 300. It may also itself carry some functional circuits, as, for example, a system planar board for conventional personal computers.

Enclosure 310 of the system 300 mechanically supports a number of subsystems 200, positioning their cards 210 so that optical bus interface units 100 are all aligned along axis 11 of the optical bus 10. The axis 11 of the bus is along the smallest dimension the subsystems, that is, perpendicular to the plane of cards 210.

Connectors 230 are inserted into sockets 331 in base 330. Wiring (not shown) among sockets 331 provide power to cards 210, and may also provide additional signals and connections to external devices, as discussed above. Connectors 230 and sockets 331 also provide position alignment of interface units 100. Rear enclosure wall 311 carries conventional guides 312. Usually required for other purposes as well, guides 312 also provide additional alignment and stability for interface units 100. The alignment functions of these elements is enhanced if they are placed physically close to the location of the interface unit on the card.

When multiple cards 210 are inserted into enclosure 310, they may transmit and receive signals on the single bidirectional optical bus 10. Again, the protocol and timing that each subsystem uses for gaining bus access and for transmitting to other subsystems is the same as would be used for any previous backplane bus in wired form. An optical signal produced in any subsystem 200 is launched through the amplitude beam splitter 140 of its interface unit in two beams along the single axis 11 of the bus 10; one beam travels to all subsystems to the left of the originating subsystem, and the other travels to to all subsystems to the right along exactly the same axis. All of the other subsystems receive this beam in the photodetectors of their own interface units, just as is the case for a wired bus. The function circuits of any receiving subsystem may later transmit further optical signals along the same axis 11, and so forth. That is, all subsystems use exactly the same line in space as the axis 11 of a bus 10 for both transmitting signals to and receiving signals from other subsystems.

Such a system avoids any necessity to align multiple beams among different subsystems, with the attendant tolerance problems. System 300 is also insensitive to missing cards, just as a wired backplane bus is. For example, no cards are present in slots two through five from the left in enclosure 10. Signals passing along axis 11 of bus 10 merely pass through those positions to the next slots, one and six. Moreover, any subsystem which does not use any signals from bus 10 need merely provide an aperture or cut-away area to allow the optical beam of bus 10 to pass through to the other subsystems. A simple, low-cost optical absorber, such as 301, at the ends of the beam might decrease noise along the bus, and also increase safety by preventing reflections outside enclosure 310.

Systems having half a dozen or so subsystems have sufficiently small losses within and through interface units 100 that conventional low-cost receiver circuits operating directly from their photodetectors 150, FIG. 1, are adequate to power functional circuits 20 for any number of cards plugged into the system. As described above, the maximum optical loss along bus 10 can be held to about 18dB for a six-card system. For larger numbers of subsystem slots, such as the fourteen-slot enclosure shown in FIG. 3, the maximum optical loss from the first card to the last could amount to about 26 dB. In this case, it may be desirable to include conventional automatic gain-control circuits (not shown) within converter 22. Circuits for handling this range of signal strengths are commercially available.

Bus interface units 100 preferably use laser diodes 110 in the near infrared range, primarily because such diodes are commercially available at low cost, are inherently strongly polarized, and can accommodate extremely high signal-switching rates. Systems having low data rates or a small number of subsystems could employ even lower-cost components. Conversely, very large systems and extremely high data rates are achievable with more advanced current components, and with future components whose shadows even now lie across the landscape of optical technology.

At the present time, discrete components permit operation in excess of 200 megabits per second (mb/sec). Available integrated technology, such as combining circuits 21 and 22 with their associated optical components 110 and 150 in a single package or on a single chip, is capable of operation beyond 600 mb/sec. Foreseeable improvements in lasers and optical elements will soon raise the bar considerably higher than 1000 mb/sec. For example, optical beam splitters, lenses, and other elements can be fabricated in miniaturized form as holographs and waveguides. It is also possible that future systems may manipulate optical signals directly, without requiring conversion to electronic form; the present interface unit could be easily modified to serve such systems. Very high data rates may impose a maximum spacing between cards, to limit signal distortion due to multiple reflections along the bus. Other modifications and adaptations within the spirit of the invention will appear to those skilled in the art.

We claim as our invention:

1. A subsystem for an electronics system having multiple subsystems mounted in a frame so as to define a single axis passing through said subsystems, said one subsystem comprising:

a support adapted for mounting on said frame;

function circuits carried by said support, and adapted to produce a first electrical signal and to receive a second electrical signal;

optical generating means for converting said first electrical signal into a first optical beam having a predetermined polarization;

an amplitude beam splitter mounted on said support so as to intersect said axis, and optically coupled to said generator for transmitting said first optical beam in two opposite directions along said axis in said predetermined polarization, and for receiving a second optical beam having said predetermined polarization from either of said two opposite directions along said same axis;

optical detecting means coupled to said amplitude beam splitter for converting said second optical beam into said second electrical signal.

2. The subsystem of claim 1 wherein said support and said frame include means for cooperatively holding said amplitude beam splitter in a predetermined position with respect to said axis.

3. The subsystem of claim 2 wherein said holding means includes connector means for providing electrical connections between said frame and said subsystem.

4. The subsystem of claim 2 wherein said holding means includes guide means.

5. The subsystem of claim 1 wherein said support includes at least one aperture along said axis for passing said optical beam through said support.

6. The subsystem of claim 1 wherein said support comprises a card having mounted thereon said function circuits, said optical generator, said amplitude beam splitter, and said optical detector.

7. The subsystem of claim 1 wherein said first electrical signal is a single serial signal.

8. The subsystem of claim 7 wherein said function circuits include means for converting multiple parallel electrical signals into said single serial first signal.

9. The subsystem of claim 1 wherein said second electrical signal is a single serial signal.

10. The subsystem of claim 9 wherein said function circuits include means for converting said single serial second signal into multiple parallel electrical signals.

11. An optical interface unit for coupling electrical signals to an optical bus, comprising:

optical generator for converting a first electrical signal into an outgoing beam having a first linear polarization mode;

a polarizing beam splitter for passing said first outgoing beam and for deflecting an incoming optical beam having a linear polarization in a different mode from that of said outgoing beam;

a polarization converter intercepting said first outgoing beam so as to convert its linear polarization to circular polarization, and further intercepting said second incoming beam so as to convert its circular polarization to linear polarization in said different mode;

an amplitude beam splitter positioned so as to intercept said outgoing circularly polarized beam for transmitting said beam in two opposite directions along a single optical axis, and for receiving said incoming beam from both of said two opposite directions along said same axis and passing said incoming beam both along said axis in the other of said directions and to said polarization converter;

an optical detector positioned so as to receive said incoming deflected beam from said polarizing beam splitter, for converting said incoming optical beam into said second electrical signal.

12. The unit of claim 11 wherein said amplitude beam splitter has a partially reflective internal surface positioned at an angle to said axis.

13. The unit of claim 12 wherein said amplitude beam splitter includes a reflection means positioned for intercepting a beam reflected from said partially reflecting surface and reflecting it back to said partially reflective surface.

14. The unit of claim 13 wherein said reflection means is a totally reflecting surface.

15. The unit of claim 13 wherein said reflection means is an external surface of said amplitude beam splitter.

16. The unit of claim 11 wherein said optical generator includes a semiconductor laser diode.

17. The unit of claim 11 wherein said laser diode produces said first linear polarization mode.

18. The unit of claim 11 wherein said optical generator includes means for collimating said outgoing beam.

19. A method for coupling first and second electrical signals to an optical bus having a single linear axis, comprising:

converting said first electrical signal to an outgoing optical beam, said beam being polarized in a first linear mode;

transforming said outgoing beam to circular polarization;

splitting said outgoing beam into two outgoing beams traveling in two opposite directions along said linear axis;

splitting an incoming beam having circular polarization and traveling along said same linear axis in either one of two mutually opposite directions into two incoming beams, one traveling further along said axis in said either one direction and the other deflected from said axis;

transforming said deflected incoming beam to linear polarization in a second mode different from said first mode;

converting said transformed deflected beam into said second electrical signal.

20. The method of claim 19 wherein said first and second linear modes are orthogonal to each other.

21. The method of claim 19 wherein the step of splitting said outgoing beam includes:

reflecting a portion of said outgoing beam onto one direction of said linear axis;

reflecting the remainder of said outgoing beam in a direction opposite its incidence;

partially reflecting said totally reflected remainder onto the other direction of said linear axis.

22. The method of claim 19 wherein the step of splitting said incoming beam includes:

partially reflecting said incoming beam along away from said linear axis;

totally reflecting said partially reflected incoming beam to form said deflected incoming beam.

* * * * *